United States Patent
Salyers

[19]

[11] Patent Number: 5,924,563
[45] Date of Patent: Jul. 20, 1999

[54] PACKAGING ARRANGEMENT FOR FILTER PRODUCTS

[75] Inventor: Gregory E. Salyers, Glen Allen, Va.

[73] Assignee: Hamilton Beach/Proctor-Silex, Inc., Glen Allen, Va.

[21] Appl. No.: 08/896,773

[22] Filed: Jul. 18, 1997

Related U.S. Application Data

[60] Provisional application No. 60/043,459, Apr. 10, 1997.

[51] Int. Cl.[6] ................................................. B65D 85/62
[52] U.S. Cl. ........................ 206/223; 206/216; 206/499; 210/282
[58] Field of Search ................................ 206/216, 499, 206/223; 210/94, 266, 282, 287, 314, 416.3, 493.5; 426/106, 124

[56] References Cited

U.S. PATENT DOCUMENTS

| | | | |
|---|---|---|---|
| 4,362,623 | 12/1982 | Holopainen | 206/499 |
| 4,522,298 | 6/1985 | Weinberger | 206/216 |
| 4,740,296 | 4/1988 | Roman | 210/94 |
| 4,975,292 | 12/1990 | Loizzi | 426/77 |
| 5,043,172 | 8/1991 | Loizzi | 426/77 |
| 5,120,439 | 6/1992 | McFarlin | 210/482 |
| 5,128,157 | 7/1992 | Ruiz | 206/447 |
| 5,567,461 | 10/1996 | Lehrer | 426/417 |
| 5,615,767 | 4/1997 | Eull et al. | 206/499 |

OTHER PUBLICATIONS

See accompanying Information Disclosure Statement regarding prior art coffee filter packaging arrangement.

*Primary Examiner*—Jim Foster
*Attorney, Agent, or Firm*—Roger S. Dybvig

[57] ABSTRACT

Paper coffee filters are stacked one atop another and packaged within a container, such as a carton or a plastic bag. The paper coffee filters define a cavity within the container in which is placed a water filter device comprising activated carbon. The paper filters are used to filter coffee grounds or the like from a brewed beverage. The water filter device is used to filter impurities from the brewing water before the brewing process. The disclosed packaging arrangement reduces packaging costs and serves to notify users that their existing water filter device has reached the end of its useful life because the coffee filters and the replacement water filter device are provided in a unitary package.

5 Claims, 1 Drawing Sheet

PACKAGING ARRANGEMENT FOR FILTER PRODUCTS

CROSS-REFERENCE TO RELATED APPLICATIONS

This is application claims the benefit of U.S. Provisional Application Ser. No. 60/043,459, filed Apr. 10, 1997.

FIELD OF THE INVENTION

This invention relates to a packaging arrangement for filter products and, more particularly, to a packaging arrangement for paper coffee filters and an activated carbon water filter for use in a coffee maker or other brewing apparatus.

BACKGROUND OF THE INVENTION

A concern that arises in preparing brewed beverages, such as coffee or tea, is the effect that impurities in the water used in brewing can have on the taste and smell of the resulting beverage. In addition, impurities in the water also raise health concerns. To reduce any such concerns, an automatic drip coffee maker or the like can be provided with a water filter device, such as a device comprising activated carbon or charcoal, to remove impurities from the brewing water before the brewing process. For example, a coffee maker typically comprises a water reservoir which holds water to be used to brew coffee, and an activated carbon water filter device can be provided in the flow path of water traveling from the reservoir to coffee grounds held in a brew basket, thereby removing impurities from the water before it reaches the brew basket. Alternatively, an activated carbon water filter could be placed directly within the water reservoir to draw impurities out of the water before it reaches the brew basket. In any case, the relatively small size of a typical household coffee maker requires the water filter device to be relatively small in size, thereby limiting the useful life of the water filter device to a relatively small number of brewing cycles. Thus, the activated carbon water filter device must be replaced regularly to provide consistent filtering of impurities from the water, which requires a user to keep track of how many brewing cycles have been completed since the water filter device was last replaced.

SUMMARY OF THE INVENTION

An object of this invention is to provide a packaging arrangement for different types of filter products that minimizes the packaging space and material required for such filter products and thereby reduces the packaging costs.

Another object of this invention is to provide a packaging arrangement for filter products which indicates to a purchaser that a filter product already in use has reached the end of its useful life and should be replaced.

In accordance with this invention, an activated carbon water filter device is provided together with a plurality of disposable paper coffee filters as a unitary package. As conventional, a plurality of paper coffee filters are stacked one atop another and packaged within a container, such as a cardboard carton or a plastic bag. Because the coffee filters are cup shaped, they define a cavity which is located within the container. The activated carbon water filter device is disposed within the cavity defined by the coffee filters. Thus, no additional packaging is required for the water filter device itself. In addition, a purchaser will be apprised of the need to replace the water filter device currently in use in the purchaser's brewing apparatus. In this respect, the useful life of the water filter device and the number of coffee filters in each container can be selected so that one water filter device is useful for a number of complete brew cycles corresponding to the number of coffee filters in a packaging container.

Alternatively, the coffee filter and the water filter device can be provided together in a common container without locating the filter device within a cavity defined by the coffee filters. In still a further alternative, the coffee filters and the water filter device can simply be secured together in any suitable manner to form a unitary package, which serves to notify a user or purchaser that an water filter device already in use has reached the end of its useful life and should be replaced.

The foregoing and other objects and advantages of this invention will become apparent from the following description and the accompanying drawings.

DETAILED DESCRIPTION

Figure 1:
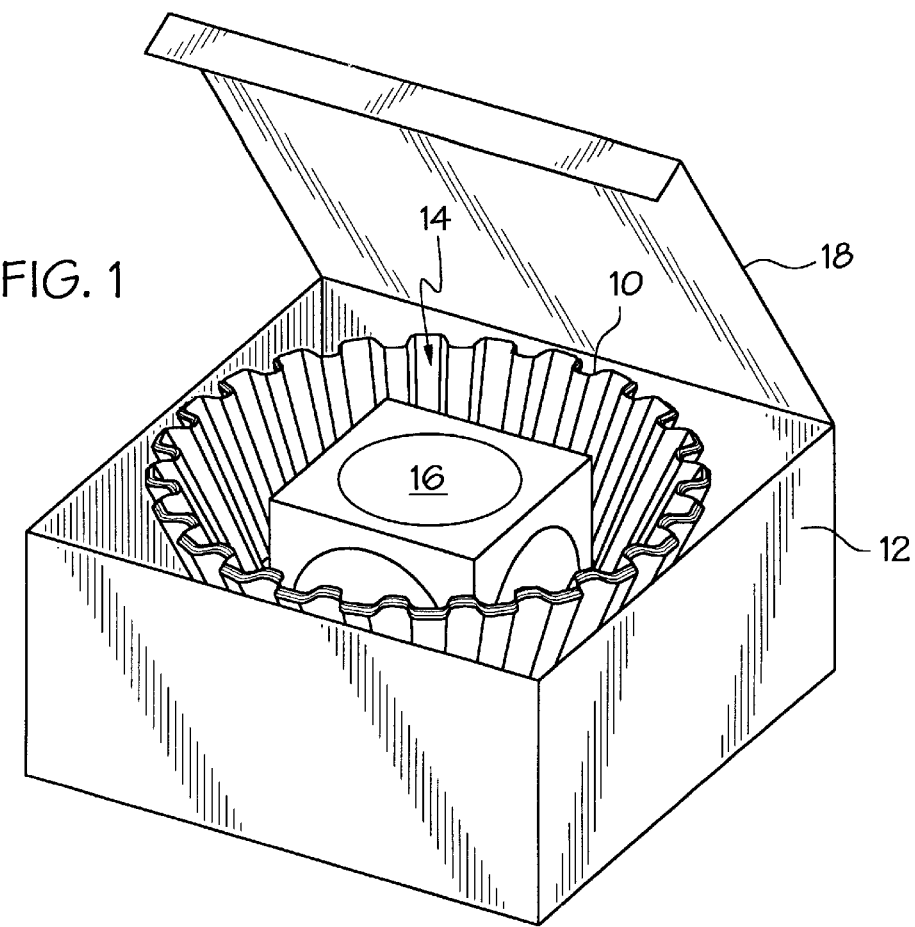
FIG. 1 is a perspective view showing a first embodiment of a packaging arrangement for filter products in accordance with this invention.

FIG. 1 illustrates a first embodiment of a packaging arrangement in accordance with this invention in which a plurality of conventional paper coffee filters 10 are stacked one atop another and disposed within the hollow interior of a container comprising a box-like carton 12 made from cardboard or other material. It will be noted that the illustrated coffee filters 10 are generally cup-shaped, but cone-shaped coffee filters (not shown) or other coffee filter configurations may be used within the confines of this invention. The coffee filters define a cavity 14 located within the carton 12 when the coffee filters 10 are disposed therein. In accordance with this invention, an activated carbon water filter device, shown diagrammatically at 16, is disposed within the cavity 14, and the carton 12, the cavity 14, and the water filter device 16 are so sized that the water filter device 16 is received entirely within the carton 12. A lid 18 of the carton 12 can thereafter be closed and secured in a conventional manner to form a single package for both the paper coffee filters 10 and the water filter device 16.

The water filter device 16 can be any water filter device useful in connection with a brewing apparatus for filtering impurities from water used in the brewing process. For example, the water filter device 16 may be a removable cartridge that is disposed within the flow path of water traveling from a water reservoir (not shown) to a brew basket (not shown) containing coffee grounds. Alternatively, the water filter device 16 may be a stand-alone filter that is simply placed within the water reservoir in contact with the water to be brewed but is not connected in any way to the brewing apparatus itself. Preferably, the water filter device 16 comprises conventional activated carbon, which is highly effective for removing chlorine and the like from the water to improve its taste and to reduce undesirable odors. In addition, the water filter device 16 may also include other active filtering ingredients, such as ion exchange resins and the like for filtering out hard metals, such as lead, and other impurities. Because the details of the water filter device 16 do not form part of this invention, they are not discussed further herein.

Figure 2:
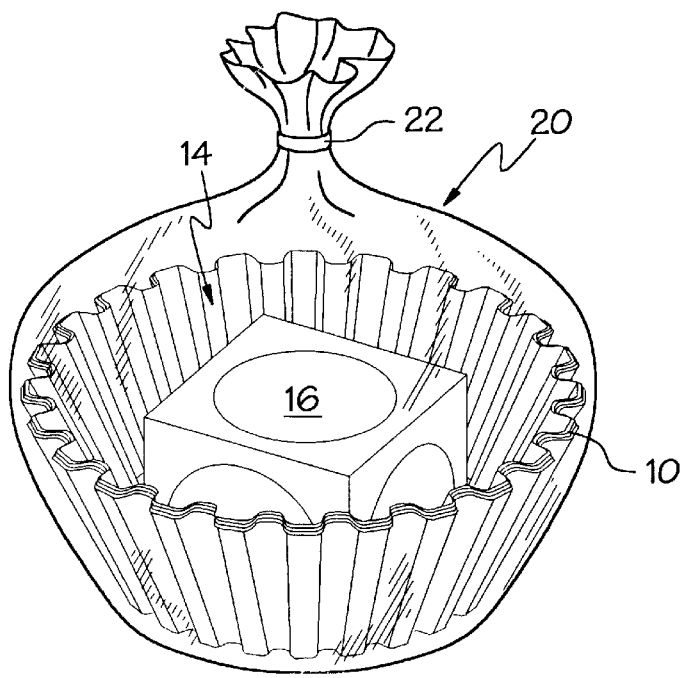
FIG. 2 is a perspective view showing a second embodiment of a packaging arrangement for filter products in accordance with this invention.

Referring to FIG. 2, paper coffee filters 10 can also be packaged within a container comprising a plastic bag closed by a conventional closure member, such as tape, a twist-tie, or the like. FIG. 2 illustrates a second embodiment of a packaging arrangement in accordance with this invention in which a water filter device 16 is disposed within a cavity 14 defined by paper coffee filters 10 and in which the coffee filters 10 and the water filter device 16 are packaged within a container comprising a plastic bag 20 closed by a conventional closure member 22.

A packaging arrangement in accordance with this invention, as shown in FIGS. 1 and 2, is advantageous for several reasons. No separate packaging is required for the water filter device 16, which reduces the cost of packaging the water filter device 16. Moreover, existing cartons 12 and bags 20 for paper coffee filters 10 can be used without modification, thus further reducing packaging costs. Because a user purchases both additional paper coffee filters 10 and a replacement filter cartridge 16 in a single package, a packaging arrangement in accordance with this invention also serves to notify a user or purchaser that their existing water filter device 16 has reached the end of its useful life and should be replaced. To ensure that a purchaser is so notified, instructions directing replacement of the existing water filter device 16 can be provided on the carton 12 or on an instructional sheet (not shown) inserted in the carton 12.

Due to of the small size of the water filter device 16, the water filter device 16 typically will have a relatively short useful life, which can be measured in a number of complete brewing cycles of the brewing apparatus (not shown) in which the water filter device 16 is to be used. For example, a water filter device 16 may provide the desired filtering characteristics for one hundred complete brewing cycles using typical household water. Of course, one skilled in the art will recognize that the actual useful life of a water filter device 16 may be longer or shorter, depending on the actual amount of impurities in the water used, which, in the case of tap water, can vary greatly depending on geographic location. In accordance with this invention, the number of paper coffee filters 10 packaged with the water filter device 16 is preferably equal to the number of brewing cycles corresponding to the predetermined useful life of the water filter device 16 using typical household water. Of course, it will be understood that although the water filter device 16 may continue filtering after it has reached the end of its predetermined useful life, such filtering may not meet predetermined filtering parameters used in determining the useful life of the water filter device, and filter replacement is still appropriate.

It will be recognized that the indication to a user that an existing water filter device 16 has reached the end of its useful life can be achieved by packaging the paper coffee filters 10 together with the water filter device 16 without disposing the water filter device 16 within a cavity defined by the paper coffee filters 10. For example, coffee filters are sometimes packaged in a folded-up condition in which they do not form a cavity. However, it is contemplated that such folded-up filters can be packaged in a common container together with a water filter device 16 to still reduce packaging costs and to provide an indication to a user that an existing water filter device 16 has reached the end of its useful life and should be replaced.

Moreover, the indication to a user that an existing water filter device 16 has reached the end of its useful life can be achieved simply by providing paper coffee filters 10 and a water filter device 16 together as a unitary package, regardless of whether the coffee filters 10 and the water filter device 16 are located within a common container. For example, coffee filters 10 can be provided in a first carton, a water filter device 16 can be provided in a second carton, and the first and second cartons can be secured together, as by shrink wrapping, a blister pack, adhesive, or any other suitable means, to form a unitary package having both coffee filters 10 and a water filter device 10. Alternatively, a bag containing coffee filters 10 and a bag containing a water filter device 16 could also be secured together in a suitable manner to form a unitary package. In still another alternative, the water filter device 16 need not be provided in a separate container but could still be secured to a container for the coffee filters 10 by shrink wrapping or any other suitable method. Of course, in any case, it is preferable for the number of paper coffee filters 10 to correspond to the predetermined useful life of the water filter device 16, thereby requiring a user to purchase a replacement water filter device after a predetermined number of brewing cycles have been completed that corresponds to the useful life of the water filter device 16.

Although the presently preferred embodiments of this invention have been described, it will be understood that within the purview of the invention various changes may be made within the scope of the following claims.

Having thus described my invention, I claim:

1. A packaging arrangement for filter products adapted for use with a brewing apparatus, comprising:

a container defining a hollow interior;

a plurality of paper brewing filters disposed in the hollow interior of said container, said paper brewing filters being stacked one atop another and defining a hollow cavity located within the hollow interior of said container; and a water filter device comprising activated carbon disposed within said hollow cavity.

2. The packaging arrangement of claim 1 wherein said container comprises a carton.

3. The packaging arrangement of claim 2 wherein said carton is made from cardboard material.

4. The packaging arrangement of claim 1 wherein said container comprises a bag.

5. The packaging arrangement of claim 1 wherein the number of paper coffee filters disposed within said container is substantially equal to a predetermined useful life of the water filter device as measured in a number of complete brewing cycles of said brewing apparatus.

\* \* \* \* \*